United States Patent
Kim et al.

(10) Patent No.: US 12,448,569 B2
(45) Date of Patent: Oct. 21, 2025

(54) LIQUID CRYSTALLINE POLYMER COMPOSITION AND MOLDED ARTICLE PRODUCED THEREFROM

(71) Applicant: LOTTE CHEMICAL CORPORATION, Seoul (KR)

(72) Inventors: Yang Il Kim, Uiwang-si (KR); Eric Arifin, Uiwang-si (KR); Jung Hun Lee, Uiwang-si (KR); Young Sub Jin, Uiwang-si (KR); Bong Jae Lee, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 0 days.

(21) Appl. No.: 18/686,535

(22) PCT Filed: Aug. 19, 2022

(86) PCT No.: PCT/KR2022/012461
§ 371 (c)(1),
(2) Date: Feb. 26, 2024

(87) PCT Pub. No.: WO2023/027437
PCT Pub. Date: Mar. 2, 2023

(65) Prior Publication Data
US 2025/0122425 A1    Apr. 17, 2025

(30) Foreign Application Priority Data
Aug. 27, 2021 (KR) .......... 10-2021-0113909

(51) Int. Cl.
*G02F 1/1333* (2006.01)
*C08K 3/34* (2006.01)
*C08L 81/06* (2006.01)
*C09K 19/40* (2006.01)
*C09K 19/52* (2006.01)

(52) U.S. Cl.
CPC .............. *C09K 19/406* (2013.01); *C08K 3/34* (2013.01); *C08L 81/06* (2013.01); *C09K 19/52* (2013.01); *C09K 2019/521* (2013.01)

(58) Field of Classification Search
CPC ...... C09K 19/40; C09K 19/406; C09K 19/52; C09K 2019/521; G02F 1/1333
See application file for complete search history.

(56) References Cited

U.S. PATENT DOCUMENTS

| | | |
|---|---|---|
| 6,433,071 B1 | 8/2002 | Arai et al. |
| 2018/0179838 A1 | 6/2018 | Nguyen |
| 2018/0346641 A1 | 12/2018 | Hegi |
| 2024/0018312 A1* | 1/2024 | Kawamura ............. C09J 133/08 |
| 2025/0122425 A1* | 4/2025 | Kim .................. C09K 19/3809 |

FOREIGN PATENT DOCUMENTS

| | | | | |
|---|---|---|---|---|
| CN | 114479464 A | * | 5/2022 | ............... C08K 7/14 |
| JP | 2002-020621 A | | 1/2002 | |
| KR | 10-2001-0049598 A | | 6/2001 | |
| KR | 10-1423766 B1 | | 7/2014 | |
| KR | 10-2018-0022693 A | | 3/2018 | |
| KR | 10-2018-0061179 A | | 6/2018 | |
| WO | 2017-038421 A1 | | 3/2017 | |
| WO | 2023/027437 A | | 3/2023 | |

OTHER PUBLICATIONS

International Search Report in counterpart International Application No. PCT/KR2022/012461 dated Nov. 29, 2022, pp. 1-7.

* cited by examiner

*Primary Examiner* — Geraldina Visconti
(74) *Attorney, Agent, or Firm* — Additon, Pendleton & Witherspoon, P.A.

(57) ABSTRACT

A liquid crystalline polymer composition of the present invention comprises: about 10-50% by weight of a liquid crystalline polymer, about 20-60% by weight of an aromatic sulfone polymer, and about 10-50% by weight of an inorganic filler having a pH of about 7-12. The liquid crystalline polymer composition has excellent fluidity, rigidity, and abrasion resistance, and generates little dust.

13 Claims, No Drawings

LIQUID CRYSTALLINE POLYMER COMPOSITION AND MOLDED ARTICLE PRODUCED THEREFROM

CROSS-REFERENCE TO RELATED APPLICATIONS

This application claims priority to and the benefit of International Application No. PCT/KR2022/012461, filed Aug. 19, 2022, which published as WO 2023/027437 on Mar. 2, 2023, and Korean Patent Application No. 10-2021-0113909, filed in the Korean Intellectual Property Office on Aug. 27, 2021, the entire disclosure of each of which is incorporated herein by reference.

TECHNICAL FIELD

The present invention relates to a liquid crystalline polymer composition and a molded article produced therefrom. More particularly, the present invention relates to a liquid crystalline polymer composition exhibiting excellent properties in terms of fluidity, rigidity, abrasion resistance, and the like while generating little dust, and a molded article produced therefrom.

BACKGROUND ART

Recent developments in electron and communication fields have led to production of mobile devices with highly integrated, complex structure and thin-walled components. Among these mobile devices, compact camera module applications are produced using liquid crystalline polymer (LCP) materials, which ensure good heat resistance and dimensional stability and can be molded to have thin walls.

However, mobile devices, such as compact camera module components produced from liquid crystalline polymer materials, generate dust during assembly and cleaning processes, and in operation of products, wear dust due to repeated impact can adversely affect camera results.

Therefore, there is a need for development of a liquid crystalline polymer composition that has good properties in terms of fluidity, rigidity, abrasion resistance, and the like while generating little dust.

The background technique of the present invention is disclosed in Korean Patent Registration No. 10-1423766 and the like.

DISCLOSURE

Technical Problem

It is one object of the present invention to provide a liquid crystalline polymer composition ensuring good properties in terms of excellent fluidity, rigidity, abrasion resistance, and the like while generating little dust.

It is another object of the present invention to provide a molded article produced from the liquid crystalline polymer composition.

The above and other objects of the present invention can be achieved by the present invention described below.

Technical Solution

1. One aspect of the present invention relates to a liquid crystalline polymer composition. The liquid crystalline polymer composition comprises: about 10 wt % to about 50 wt % of a liquid crystalline polymer; about 20 wt % to about 60 wt % of an aromatic sulfone polymer; and about 10 wt % to about 50 wt % of inorganic fillers having a pH of about 7 to about 12.
2. In embodiment 1, the liquid crystalline polymer may have a crystalline melting point of about 280° C. to about 380° C.
3. In embodiments 1 or 2, the aromatic sulfone polymer may comprise repeat units represented by Formula 1.

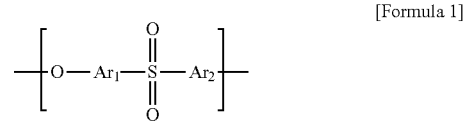

[Formula 1]

where $Ar_1$ and $Ar_2$ are each independently a $C_6$ to $C_{20}$ arylene group.

4. In embodiments 1 to 3, the aromatic sulfone polymer may comprise at least one of a polysulfone comprising repeat units represented by Formula 1a, a polyphenylsulfone comprising repeat units represented by Formula 1b, and a polyethersulfone comprising repeat units represented by Formula 1c.

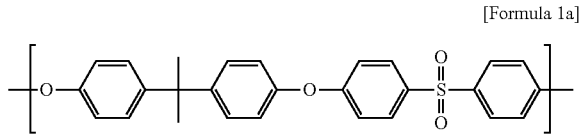

[Formula 1a]

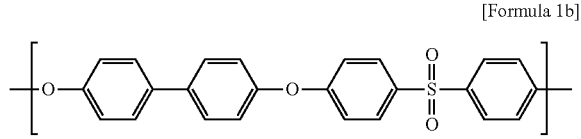

[Formula 1b]

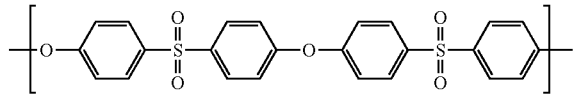

[Formula 1c]

5. In embodiments 1 to 4, the inorganic fillers having a pH of about 7 to about 12 may comprise at least one of calcium silicate and magnesium silicate.
6. In embodiments 1 to 5, the liquid crystalline polymer and the aromatic sulfone polymer may be present in a weight ratio of about 1:0.7 to about 1:3.5.
7. In embodiments 1 to 6, the liquid crystalline polymer and the inorganic fillers having a pH of about 7 to about 12 may be present in a weight ratio of about 1:0.4 to about 1:3.
8. In embodiments 1 to 7, the aromatic sulfone polymer and the inorganic fillers having a pH of about 7 to about 12 may be present in a weight ratio of about 1:0.3 to about 1:2.5.
9. In embodiments 1 to 8, the liquid crystalline polymer composition may have a spiral flow length of about 170 mm to about 200 mm, as measured on a specimen prepared by injection molding in a spiral-shaped mold having a width of 10 mm and a thickness of 2 mm under conditions of a molding temperature of 370° C., a mold temperature of 120° C., an injection pressure of 160 MPa, and an injection speed of 100 mm/s.

10. In embodiments 1 to 9, the liquid crystalline polymer composition may have a tensile strength of about 800 kgf/cm² to about 1,000 kgf/cm², as measured on a 3.2 mm thick specimen in accordance with ASTM D638.
11. In embodiments 1 to 10, the liquid crystalline polymer composition may generate about 0.1 mg to about 0.6 mg of dust, as measured on a 1.2 mm thick rib specimen prepared from the liquid crystalline polymer composition after a boss specimen prepared from the liquid crystalline polymer composition and fastened with an M3 screw is reciprocated on an upper surface of the rib specimen at a speed of 50 times/min under a load of 2.5 kg for 2 hours.
12. Another aspect of the invention relates to a molded article. The molded article may be produced from the liquid crystalline polymer composition according to any one of claims 1 to 11.
13. In embodiment 12, the molded article may be a compact camera module component.

Advantageous Effects

The present invention provides a liquid crystalline polymer composition according to the present invention that ensures good properties in terms of excellent fluidity, rigidity, abrasion resistance, and the like while generating little dust, and a molded article formed therefrom.

BEST MODE

Hereinafter, exemplary embodiments of the present invention will be described in detail.

A liquid crystalline polymer composition according to the present invention comprises: (A) a liquid crystalline polymer; (B) an aromatic sulfone polymer; and (C) inorganic fillers having a pH of about 7 to about 12.

As used herein to represent a specific numerical range, "a to b" is defined as "≥a and ≤b".

(A) Liquid Crystalline Polymer

A liquid crystalline polymer (LCP) according to one embodiment of the present invention has an anisotropic melt phase and may be a liquid crystalline polyester amide, a liquid crystalline polyester or the like, which is referred to as a thermotropic liquid crystalline polymer. Here, the anisotropic melt phase of the liquid crystalline polymer can be determined through a typical polarization system using crossed polarizers. For example, under a nitrogen atmosphere, a sample on a Leitz heating plate may be observed with a Leitz polarizing microscope.

In some embodiments, the liquid crystalline polymer may comprise repeat units, such as aromatic oxycarbonyl repeat units, aromatic dicarbonyl repeat units, aromatic dioxy repeat units, aromatic aminooxy repeat units, aromatic aminocarbonyl repeat units, aromatic diamino repeat units, aromatic oxydicarbonyl repeat units, aliphatic dioxy repeat units, combinations thereof, and the like.

In some embodiments, the liquid crystalline polymer composed of these repeat units may include both a polymer providing the anisotropic melt phase and a polymer not providing the anisotropic melt phase depending on structural elements of the polymer and the ratio and arrangement distribution of the structural elements. The liquid crystalline polymer used in the present invention exhibits the anisotropic melt phase.

In some embodiments, examples of monomers providing aromatic oxycarbonyl repeat units include p-hydroxybenzoic acid, m-hydroxybenzoic acid, o-hydroxybenzoic acid, 6-hydroxy-2-naphthoic acid, 5-hydroxy-2-naphthoic acid, 3-hydroxy-2-naphthoic acid, 4'-hydroxybiphenyl-4-carboxylic acid, 3'-hydroxybiphenyl-4-carboxylic acid, 4'-hydroxybiphenyl-3-carboxylic acid, and ester-forming derivatives, such as alkyl-, alkoxy- or halogen-substituted derivatives thereof, acyl derivatives thereof, ester derivatives thereof, and acyl halides. In particular, p-hydroxybenzoic acid and 6-hydroxy-2-naphthoic acid are preferred in terms of easier control of the properties and melting point of the resulting liquid crystalline polymer.

In some embodiments, examples of monomers providing aromatic dicarbonyl repeat units include aromatic dicarboxylic acids, such as terephthalic acid, isophthalic acid, 2,6-naphthalene dicarboxylic acid, 1,6-naphthalene dicarboxylic acid, 2,7-naphthalene dicarboxylic acid, 1,4-naphthalene dicarboxylic acid, and 4,4'-dicarboxybiphenyl, and ester-forming derivatives, such as alkyl-, alkoxy- or halogen-substituted derivatives thereof, ester derivatives thereof, and acid halides. In particular, terephthalic acid and 2,6-naphthalene dicarboxylic acid are preferred in terms of easier control of mechanical properties, heat resistance, melting point and molding properties of the resulting liquid crystalline polymer.

In some embodiments, examples of monomers providing aromatic dioxy repeat units include aromatic diols, such as hydroquinone, resorcin, 2,6-dihydroxy naphthalene, 2,7-dihydroxy naphthalene, 1,6-dihydroxy naphthalene, 1,4-dihydroxy naphthalene, 4,4'-dihydroxy biphenyl, 3,3'-dihydroxy biphenyl, 3,4'-dihydroxy biphenyl, and 4,4'-dihydroxy biphenyl ether, and ester-forming derivatives, such as alkyl-, alkoxy- or halogen-substituted derivatives thereof, and acyl derivatives thereof. In particular, hydroquinone and 4,4'-dihydroxybiphenyl are preferred in terms of good reactivity during the polymerization process and good properties of the resulting liquid crystalline polymer formulation.

In some embodiments, examples of monomers providing aromatic aminooxy repeat units include aromatic hydroxyamines, such as p-aminophenol, m-aminophenol, 4-amino-1-naphthol, 5-amino-1-naphthol, 8-amino-2-naphthol, and 4-amino-4'-hydroxybiphenyl, ester-forming derivatives, such as alkyl-, alkoxy- or halogen-substituted derivatives thereof and acyl derivatives thereof, and amide-forming derivatives, such as N-acyl derivatives thereof.

In some embodiments, examples of monomers providing aromatic diamino repeat units include aromatic diamines, such as p-phenylenediamine, m-phenylenediamine, 1,5-diaminonaphthalene, 1,8-diaminonaphthalene, alkyl-, alkoxy- or halogen-substituted derivatives, and amide-forming derivatives, such as N-acyl derivatives thereof.

In some embodiments, examples of monomers providing aromatic aminocarbonyl repeat units include aromatic aminocarboxylic acids, such as p-aminobenzoic acid, m-aminobenzoic acid, and 6-amino-2-naphthoic acid, and ester-forming derivatives, such as alkyl-, alkoxy- or halogen-substituted derivatives thereof, acyl derivatives thereof, ester derivatives thereof, and acid halides, and amide-forming derivatives, such as N-acyl derivatives thereof.

In some embodiments, examples of monomers providing aromatic oxydicarbonyl repeat units include hydroxy-aromatic dicarboxylic acids, such as 3-hydroxy-2,7-naphthalene dicarboxylic acid, 4-hydroxyisophthalic acid, and 5-hydroxyisophthalic acid, and ester-forming derivatives, such as alkyl-, alkoxy- or halogen-substituted derivatives thereof, acyl derivatives thereof, ester derivatives thereof, and acyl halides.

In some embodiments, examples of monomers providing aliphatic dioxy repeat units include aliphatic diols, such as ethylene glycol, 1,4-butanediol, and 1,6-hexanediol, and acyl derivatives thereof. Further, the liquid crystalline polymer having aliphatic dioxy repeat units may be obtained by reacting a polyester having aliphatic dioxy repeat units, such as polyethylene terephthalate or polybutylene terephthalate, with the aromatic oxycarboxylic acid, aromatic dicarboxylic acid, aromatic diol, aromatic hydroxyamine, aromatic aminocarboxylic acid, aromatic diamine, or acyl derivatives thereof, ester derivatives thereof, or acid halides.

In some embodiments, the liquid crystalline polymer may have a thioester bond so long as the bond does not impair objectives of the present invention. Examples of monomers providing a thioester bond include mercapto-aromatic carboxylic acids, aromatic dithiols, and hydroxy-aromatic thiols. These additional monomers may be present in an amount of 10 mol % or less based on the total amount of the monomers providing aromatic oxycarbonyl, aromatic dicarbonyl, aromatic dioxy, aromatic aminooxy, aromatic diamino, aromatic oxy-di-carbonyl and aliphatic dioxy repeat units.

In particular, a preferred liquid crystalline polymer comprises an aromatic oxycarbonyl repeat units comprising 4-oxybenzoyl repeat units and/or 6-oxy-2-naphthoyl repeat units.

In some embodiments, examples of the preferred liquid crystalline polymer comprising 4-oxybenzoyl repeat units and/or 6-oxy-2-naphthoyl repeat units may include:
1) 4-hydroxybenzoic acid/6-hydroxy-2-naphthoic acid copolymer,
2) 4-hydroxybenzoic acid/terephthalic acid/4,4'-dihydroxybiphenyl copolymer,
3) 4-hydroxybenzoic acid/terephthalic acid/isophthalic acid/4,4'-dihydroxybiphenyl copolymer,
4) 4-hydroxybenzoic acid/terephthalic acid/isophthalic acid/4,4'-dihydroxybiphenyl/hydroquinone copolymer,
5) 4-hydroxybenzoic acid/terephthalic acid/hydroquinone copolymer,
6) 6-hydroxy-2-naphthoic acid/terephthalic acid/hydroquinone copolymer,
7) 4-hydroxybenzoic acid/6-hydroxy-2-naphthoic acid/terephthalic acid/4,4'-dihydroxybiphenyl copolymer,
8) 6-hydroxy-2-naphthoic acid/terephthalic acid/4,4'-dihydroxybiphenyl copolymer,
9) 4-hydroxybenzoic acid/6-hydroxy-2-naphthoic acid/terephthalic acid/hydroquinone copolymer,
10) 4-hydroxybenzoic acid/2,6-naphthalene dicarboxylic acid/4,4'-dihydroxybiphenyl copolymer,
11) 4-hydroxybenzoic acid/terephthalic acid/2,6-naphthalene dicarboxylic acid/hydroquinone copolymer,
12) 4-hydroxybenzoic acid/2,6-naphthalene dicarboxylic acid/hydroquinone copolymer,
13) 4-hydroxybenzoic acid/6-hydroxy-2-naphthoic acid/2,6-naphthalene dicarboxylic acid/hydroquinone copolymer,
14) 4-hydroxybenzoic acid/terephthalic acid/2,6-naphthalene dicarboxylic acid/hydroquinone/4,4'-dihydroxybiphenyl copolymer,
15) 4-hydroxybenzoic acid/terephthalic acid/4-aminophenol copolymer,
16) 6-hydroxy-2-naphthoic acid/terephthalic acid/4-aminophenol copolymer,
17) 4-hydroxybenzoic acid/6-hydroxy-2-naphthoic acid/terephthalic acid/4-aminophenol copolymer,
18) 4-hydroxybenzoic acid/terephthalic acid/4,4'-dihydroxybiphenyl/4-aminophenol copolymer,
19) 4-hydroxybenzoic acid/terephthalic acid/ethylene glycol copolymer,
20) 4-hydroxybenzoic acid/terephthalic acid/4,4'-dihydroxybiphenyl/ethylene glycol copolymer,
21) 4-hydroxybenzoic acid/6-hydroxy-2-naphthoic acid/terephthalic acid/ethylene glycol copolymers, and
22) 4-hydroxybenzoic acid/6-hydroxy-2-naphthoic acid/terephthalic acid/4,4'-dihydroxybiphenyl/ethylene glycol copolymer.

In particular, the copolymers of 1), 9) and 13) are preferred in terms of moldability and mechanical properties of the polymer.

In some embodiments, the liquid crystalline polymer may be a polymer formulation comprising two or more liquid crystalline polymers for the purpose of increasing fluidity of the polymer upon molding.

In some embodiments, a method of preparing the liquid crystalline polymer is not limited to a particular method and may be selected from any methods known in the art. For example, a typical polycondensation method, such as a slurry polymerization method and a melt acidolysis method, may be used to create ester and/or amide bonds in the monomer elements described above through preparation of the polymer.

In some embodiments, the melt acidolysis method is preferably used for preparation of the liquid crystalline polymer. In this method, the monomers are heated to produce a molten solution, followed by reacting the molten solution to produce a molten polymer. The final step of this method may be performed in a vacuum to facilitate removal of volatile by-products, such as acetic acid or water.

In some embodiments, the slurry polymerization method produces a solid-state polymer in the form of a suspension in a heat-exchange liquid medium through reaction of the monomers in a heat-exchange fluid.

In some embodiments, in either the melt acidolysis method or the slurry polymerization method, the monomers may be polymerized in the form of a low-grade acyl derivative obtained through acylation of a hydroxyl group and/or an amino group. The low-grade acyl group may include 2 to 5, for example 2 to 3, carbon atoms. Preferably, an acetylated monomer is used in the above reaction.

In some embodiments, the low-grade acyl derivative of the monomers may be prepared through independent acylation of the monomers or may be generated in a reaction system by adding an acylation agent, such as acetic anhydride, to the monomer during preparation of the liquid crystalline polymer.

In some embodiments, in either the melt acidolysis method or the slurry polymerization method, a catalyst may be used in the above reaction, as needed.

In some embodiments, examples of the catalysts include organotin compounds, such as dialkyl tin oxides (for example, dibutyl tin oxide) and diaryl tin oxides; antimony trioxide; titanium dioxide; organotitanium compounds, such as alkoxy titanium silicates and titanium alkoxides; alkali or alkaline earth metal salts of carboxylic acid, such as potassium acetate; salts of inorganic acids (for example, $K_2SO_4$); and gaseous acid catalysts, such as Lewis acid (for example, $BF_3$) and hydrogen halide (for example, HCl).

In some embodiments, when the catalyst is used, the amount of the catalyst added to the reaction based on the total amount of monomers may range from about 10 ppm to about 1,000 ppm, for example, about 20 ppm to about 200 ppm.

In some embodiments, the liquid crystalline polymer may be obtained through polymerization in a molten state in a reaction vessel and may be processed to produce pellets, flakes or powder.

In some embodiments, the liquid crystalline polymer prepared in the form of pellets, flakes or powder may be heated to a substantially solid state in a vacuum or under an inert gaseous atmosphere, such as nitrogen or helium, as needed. This heat treatment process may be performed at a temperature of about 260° C. to about 350° C., for example, about 280° C. to about 320° C.

In some embodiments, the liquid crystalline polymer may have a crystalline melting point (Tm) of about 280° C. to about 380° C., as determined by differential scanning calorimetry. The crystalline melting point may be determined as follows:

A differential scanning calorimeter (DSC) Exstar 6000 (Seiko Instruments Inc., Chiba, Japan) or the same type of DSC device is used. A liquid crystalline polymer sample to be observed is heated from room temperature at a rate of 20° C./min to measure the endothermic peak (Tm1). Then, the sample is held at a temperature 20° C. to 50° C. above Tm1 for 10 min. The sample is then cooled to room temperature at a rate of 20° C./min and reheated at a rate of 20° C./min. The endothermic peak found in the final step is recorded as the crystalline melting point (Tm) of the liquid crystalline polymer sample.

In some embodiments, the liquid crystalline polymer may be present in an amount of about 10 wt % to about 50 wt %, for example, about 20 wt % to about 40 wt %, based on 100 wt % of the liquid crystalline polymer composition. If the content of the liquid crystalline polymer is less than about 10 wt % based on 100 wt % of the liquid crystalline polymer composition, the liquid crystalline polymer composition can suffer from deterioration in liquidity and the like, and if the content of the liquid crystalline polymer exceeds about 50 wt %, the liquid crystalline polymer composition can suffer from deterioration in rigidity, abrasion resistance, and the like.

(B) Aromatic Sulfone Polymer

The aromatic sulfone polymer according to one embodiment of the present invention may be applied together with the liquid crystalline polymer and the inorganic fillers having a pH of about 7 to about 12 to improve rigidity, abrasion resistance, and the like of the liquid crystalline polymer composition while suppressing dust generation, and may be selected from typical aromatic sulfone polymers.

In some embodiments, the aromatic sulfone polymer may comprise repeat units represented by Formula 1.

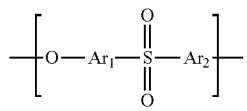

[Formula 1]

where $Ar_1$ and $Ar_2$ are each independently a $C_6$ to $C_{20}$ arylene group, for example, a phenylene group, a biphenylene group, and the like.

In some embodiments, the aromatic sulfone polymer may comprise at least one of a polysulfone comprising repeat units represented by Formula 1a, a polyphenylsulfone comprising repeat units represented by Formula 1b, and a polyethersulfone comprising repeat units represented by Formula 1c below.

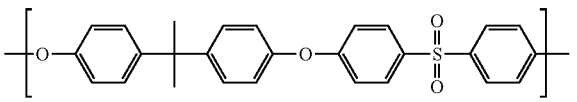

[Formula 1a]

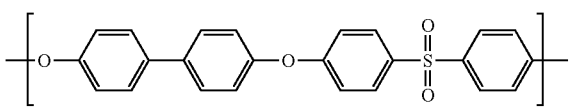

[Formula 1b]

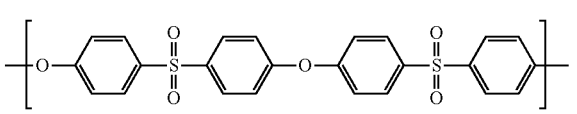

[Formula 1c]

In some embodiments, the aromatic sulfone polymer may have a melt-flow Index (MI) of about 10 to about 30 g/10 min, for example, about 15 to about 25 g/10 min, as measured at 360° C. under a load of 10 kgf in accordance with ASTM D1238. Within this range, the liquid crystalline polymer composition can have good rigidity, abrasion resistance, and the like.

In some embodiments, the aromatic sulfone polymer may be present in an amount of about 20 wt % to about 60 wt %, for example, about 30 wt % to about 50 wt %, based on 100 wt % of the liquid crystalline polymer composition. If the content of the aromatic sulfone polymer is less than about 20 wt % based on 100 wt % of the liquid crystalline polymer composition, the liquid crystalline polymer composition can suffer from deterioration in rigidity, abrasion resistance, and the like, and if the content of the aromatic sulfone polymer exceeds about 60 wt %, the liquid crystalline polymer composition can suffer from deterioration in fluidity and the like.

In some embodiments, the liquid crystalline polymer (A) and the aromatic sulfone polymer (B) may be present in a weight ratio (A:B) of about 1:0.7 to about 1:3.5, for example, about 1:0.8 to about 1:2.5. Within this range, the liquid crystalline polymer composition can exhibit good fluidity, rigidity, abrasion resistance, and the like.

(C) Inorganic Fillers Having a pH of about 7 to about 12

The inorganic fillers having a pH of about 7 to about 12 according to one embodiment of the present invention may be applied together with the liquid crystalline polymer and the aromatic sulfone polymer to improve abrasion resistance of the liquid crystalline polymer composition while suppressing dust generation.

In some embodiments, if the pH of the inorganic fillers is less than about 7, the liquid crystalline polymer composition can suffer from deterioration in fluidity, rigidity and/or abrasion resistance, and if the pH of the inorganic fillers exceeds about 12, the liquid crystalline polymer composition can suffer from deterioration in fluidity, rigidity, and the like. Here, the pH of the inorganic fillers may be measured using a pH meter after heating 1 g of the inorganic fillers at 750° C. for 1 hour, evenly dispersing the inorganic fillers in 30 ml DI water, and extracting the inorganic fillers with PTFE 0.45 μm.

In some embodiments, the inorganic fillers having a pH of about 7 to about 12 may comprise a metal. The metal may comprise at least one of an alkali metal or an alkaline earth metal and the basic inorganic compound may comprise calcium (Ca) or magnesium (Mg).

In some embodiments, the inorganic fillers having a pH of about 7 to about 12 may comprise calcium silicate, magnesium silicate, combinations thereof, and the like.

In some embodiments, the inorganic fillers having a pH of about 7 to about 12 may have an acicular shape and may have a length-to-particle diameter ratio of about 5:1 to about 20:1. Here, the length refers to a longitudinal length of the inorganic fillers and the particle diameter refers to a length of a cross-section.

In some embodiments, the inorganic fillers having a pH of about 7 to about 12 may be present in an amount of about 10 wt % to about 50 wt %, for example, about 20 wt % to about 40 wt %, based on 100 wt % of the liquid crystalline polymer composition. If the content of the inorganic fillers is less than about 10 wt % based on 100 wt % of the liquid crystalline polymer composition, the liquid crystalline polymer composition can suffer from deterioration in rigidity, and if the content of the inorganic fillers exceeds about 50 wt %, the liquid crystalline polymer composition can suffer from deterioration in fluidity, abrasion resistance, and the like.

In some embodiments, the liquid crystalline polymer (A) and the inorganic fillers (C) having a pH of about 7 to about 12 may be present in a weight ratio (A:C) of about 1:0.4 to about 1:3, for example, about 1:0.5 to about 1:2. Within this range, the liquid crystalline polymer composition can have good fluidity, abrasion resistance, and the like.

In some embodiments, the aromatic sulfone polymer (B) and the inorganic fillers (C) having a pH of about 7 to about 12 may be present in a weight ratio (B:C) of about 1:0.3 to about 1:2.5, for example, about 1:0.4 to about 1:1.5. Within this range, the liquid crystalline polymer composition can have good abrasion resistance, rigidity, and the like.

The liquid crystalline polymer composition according to one embodiment of the present invention may further comprise additives for typical liquid crystalline polymer compositions. The additives may include antioxidants, anti-drip agents, lubricants, release agents, nucleating agents, antistatic agents, stabilizers, pigments, dyes, mixtures thereof, and the like, without being limited thereto. The additives may be present in an amount of about 0.001 to about 40 parts by weight, for example, about 0.1 to about 10 parts by weight, relative to about 100 parts by weight of the liquid crystalline polymer.

The liquid crystalline polymer composition according to one embodiment of the present invention may be prepared in the form of pellets by mixing the above components, followed by melt extrusion in a typical twin-screw extruder at about 300° C. to about 400° C., for example, about 320° C. to about 380° C.

In some embodiments, the liquid crystalline polymer composition may have a spiral flow length of about 170 mm to about 200 mm, for example, about 175 mm to about 195 mm, as measured on a specimen prepared by injection molding in a spiral-shaped mold having a width of 10 mm and a thickness of 2 mm under conditions of a molding temperature of 370° C., a mold temperature of 120° C., an injection pressure of 160 MPa, and an injection speed of 100 mm/s In some embodiments, the liquid crystalline polymer composition may have a tensile strength of about 800 kgf/cm$^2$ to about 1,000 kgf/cm$^2$, for example, about 850 kgf/cm$^2$ to about 980 kgf/cm$^2$, as measured on a 3.2 mm thick specimen in accordance with ASTM D638.

In some embodiments, the liquid crystalline polymer composition may generate about 0.1 mg to about 0.6 mg of dust, for example, about 0.2 mg to about 0.5 mg of dust, as measured on a 1.2 mm thick rib specimen prepared from the liquid crystalline polymer composition after a boss specimen prepared from the liquid crystalline polymer composition and fastened with an M3 screw is reciprocated on an upper surface of the rib specimen at a rate of 50 strokes/min under a load of 2.5 kg for 2 hours.

A molded article according to the present invention is formed from the liquid crystalline polymer composition. The liquid crystalline polymer composition may be prepared in pellet form and the prepared pellets may be produced into various molded articles (products) through various molding methods, such as injection molding, extrusion molding, vacuum molding, casting, and the like. These molding methods are well known to a person having ordinary knowledge in the art. The molded article has good fluidity, rigidity and abrasion resistance while generating little dust and is useful for manufacturing surface-mounted electronic devices including switches, relays, connectors, concentrators, coils, transducers, camera modules, antennas, and chip antenna switches, and devices mounted via lead-free solders processed at higher temperatures. For example, the molded article may be a compact camera module component and the like.

MODE FOR INVENTION

Next, the present invention will be described in more detail with reference to some examples. It should be understood that these examples are provided for illustration only and are not to be construed in any way as limiting the invention.

EXAMPLE

Details of components used in Examples and Comparative Examples are as follows.
(A) Liquid Crystalline Polymer
  A liquid crystalline polymer (LCP) (Manufacturer: WOTE, Product name: WTHP22) was used.
(B) Aromatic Sulfone Polymers
  (B1) Polysulfone (Manufacturer: BASF, Product name: S2010) was used.
  (B2) Polyethersulfone (Manufacturer: BASF, Product name: E2010) was used.
(C) Inorganic Fillers
  (C1) A metal inorganic compound (calcium silicate) having a pH of 9.7 (Manufacturer: NYCO minerals, Product name: Nyglos 12) was used.
  (C2) A metal inorganic compound (calcium silicate) having a pH of 10.3 (Manufacturer: QUARZWERKE, Product name: Tremin 939-300MST) was used.
  (C3) A non-metallic inorganic compound (glass fiber) having a pH of 4.3 (Manufacturer: Nittobo, Product name: CSG 3PA-820) was used.
  (C4) A non-metallic inorganic compound (glass fiber) having a pH of 5.3 (Manufacturer: KCC, Product name: CS 350) was used.

Examples 1 to 9 and Comparative Examples 1 to 8

The above components were mixed in amounts as listed in Tables 1 to 3 and subjected to extrusion at 340° C., thereby preparing pellets. Extrusion was performed using a twin-screw extruder (L/D=44, diameter: 45 mm). The prepared pellets were dried at 80° C. for 4 hours or more and injection-molded in a 6 oz. injection molding machine (molding temperature: 370° C., mold temperature: 120° C.), thereby preparing specimens. The specimens were evaluated as to the following properties by the following method and results are shown in Tables 1 to 3.

Property Evaluation (1) Fluidity evaluation: Spiral flow length (unit: mm) was measured on a specimen prepared by injection molding in a spiral-shaped mold having a width of 10 mm and a thickness of 2 mm under conditions of a molding temperature of 370° C., a mold temperature of 120° C., an injection pressure of 160 MPa, and an injection speed of 100 mm/s.

(2) Stiffness evaluation: Tensile strength (TS, unit: kgf/cm$^2$) was measured on a 3.2 mm thick specimen at 50 mm/min in accordance with ASTM D638.

(3) Abrasion resistance evaluation: A boss specimen fastened with M3 screws and a 1.2 mm thick rib specimen were prepared from the liquid crystalline polymer composition prepared in each of Examples and Comparative Examples. Then, the boss specimen was reciprocated on an upper surface of the rib specimen at a rate of 50 strokes/min under a load of 2.5 kg for 2 hours, followed by measuring the amount of wear dust (wear amount, unit: mg) of the rib specimen.

TABLE 1

|  | Example | | | | |
| --- | --- | --- | --- | --- | --- |
|  | 1 | 2 | 3 | 4 | 5 |
| (A) (wt %) | 30 | 30 | 30 | 20 | 40 |
| (B1) (wt %) | 40 | 40 | — | 45 | 35 |
| (B2) (wt %) | — | — | 40 | — | — |
| (C1) (wt %) | 30 | — | 30 | 35 | 25 |
| (C2) (wt %) | — | 30 | — | — | — |
| (C3) (wt %) | — | — | — | — | — |
| (C4) (wt %) | — | — | — | — | — |
| Spiral Flow Length (mm) | 180 | 192 | 175 | 175 | 190 |
| Tensile strength (kgf/cm$^2$) | 950 | 930 | 940 | 910 | 890 |
| Amount of wear dust (mg) | 0.29 | 0.41 | 0.31 | 0.25 | 0.46 |

TABLE 2

|  | Example | | | |
| --- | --- | --- | --- | --- |
|  | 6 | 7 | 8 | 9 |
| (A) (wt %) | 35 | 25 | 35 | 25 |
| (B1) (wt %) | 30 | 50 | 45 | 35 |
| (B2) (wt %) | — | — | — | — |
| (C1) (wt %) | 35 | 25 | 20 | 40 |
| (C2) (wt %) | — | — | — | — |
| (C3) (wt %) | — | — | — | — |
| (C4) (wt %) | — | — | — | — |
| Spiral Flow Length (mm) | 187 | 180 | 191 | 175 |
| Tensile strength (kgf/cm$^2$) | 900 | 920 | 860 | 970 |
| Amount of wear dust (mg) | 0.38 | 0.22 | 0.26 | 0.44 |

TABLE 3

|  | Comparative Example | | | |
| --- | --- | --- | --- | --- |
|  | 1 | 2 | 3 | 4 |
| (A) (wt %) | 5 | 55 | 42.5 | 17.5 |
| (B1) (wt %) | 52.5 | 27.5 | 15 | 65 |
| (B2) (wt %) | — | — | — | — |
| (C1) (wt %) | 42.5 | 17.5 | 42.5 | 17.5 |
| (C2) (wt %) | — | — | — | — |
| (C3) (wt %) | — | — | — | — |
| (C4) (wt %) | — | — | — | — |
| Spiral Flow Length (mm) | 140 | 215 | 195 | 144 |
| Tensile strength (kgf/cm$^2$) | 900 | 740 | 730 | 1,050 |
| Amount of wear dust (mg) | 0.42 | 0.91 | 0.91 | 0.56 |

TABLE 4

|  | Comparative Example | | | |
| --- | --- | --- | --- | --- |
|  | 5 | 6 | 7 | 8 |
| (A) (wt %) | 42.5 | 17.5 | 30 | 30 |
| (B1) (wt %) | 52.5 | 27.5 | 40 | 40 |
| (B2) (wt %) | — | — | — | — |
| (C1) (wt %) | 5 | 55 | — | — |
| (C2) (wt %) | — | — | — | — |
| (C3) (wt %) | — | — | 30 | — |
| (C4) (wt %) | — | — | — | 30 |
| Spiral Flow Length (mm) | 220 | 155 | 185 | 160 |
| Tensile strength (kgf/cm$^2$) | 630 | 1,080 | 790 | 910 |
| Amount of wear dust (mg) | 0.47 | 0.95 | 1.02 | 1.33 |

From the above results, it can be seen that the liquid crystalline polymer composition according to the present invention has good properties in terms of fluidity (spiral flow length), rigidity (tensile strength), abrasion resistance, and the like while generating little dust.

Conversely, it could be seen that the composition of Comparative Example 1 prepared using an insufficient amount of the liquid crystalline polymer suffered from deterioration in fluidity and the like; the composition of Comparative Example 2 prepared using an excess of the liquid crystalline polymer suffered from deterioration in rigidity, abrasion resistance, and the like; the composition of Comparative Example 3 prepared using an insufficient amount of the aromatic sulfone polymer suffered from deterioration in rigidity, abrasion resistance, and the like; and the composition of Comparative Example 4 prepared using an excess of the aromatic sulfone polymer suffered from deterioration in fluidity and the like. In addition, the composition of Comparative Example 5 prepared using an insufficient amount of the inorganic fillers having a pH of about 7 to about 12 suffered from deterioration in rigidity and the like; and the composition of Comparative Example 6 prepared using an excess of the inorganic fillers having a pH of about 7 to about 12 suffered from deterioration in fluidity, abrasion resistance, and the like. It could be seen that the composition prepared using glass fiber (C3) having a pH of 4.3 (Comparative Example 7) suffered from deterioration in rigidity, abrasion resistance, and the like; and the composition prepared using glass fiber (C4) having a pH of 5.3 (Comparative Example 8) suffered from deterioration in fluidity, abrasion resistance, and the like.

Although the present invention has been described with reference to some example embodiments, it should be understood by those skilled in the art that these embodiments are given by way of illustration only and that various modifications, variations and alterations can be made without departing from the spirit and scope of the invention. Therefore, the embodiments should not be construed as limiting the technical spirit of the present invention, but should be construed as illustrating the technical spirit of the present invention. The scope of the invention should be interpreted according to the following appended claims as covering all modifications or variations derived from the appended claims and equivalents thereto.

The invention claimed is:

1. A liquid crystalline polymer composition comprising:
   10 wt % to 50 wt % of a liquid crystalline polymer;
   20 wt % to 60 wt % of an aromatic sulfone polymer; and
   10 wt % to 50 wt % of inorganic fillers having a pH of 7 to 12.

2. The liquid crystalline polymer composition according to claim 1, wherein the liquid crystalline polymer has a crystalline melting point of 280° C. to 380° C.

3. The liquid crystalline polymer composition according to claim 1, wherein the aromatic sulfone polymer comprises repeat units represented by Formula 1:

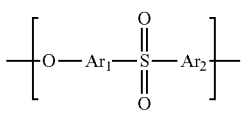

[Formula 1]

where $Ar_1$ and $Ar_2$ are each independently a $C_6$ to $C_{20}$ arylene group.

4. The liquid crystalline polymer composition according to claim 1, wherein the aromatic sulfone polymer comprises at least one of a polysulfone comprising repeat units represented by Formula 1a, a polyphenylsulfone comprising repeat units represented by Formula 1b, and a polyethersulfone comprising repeat units represented by Formula 1c:

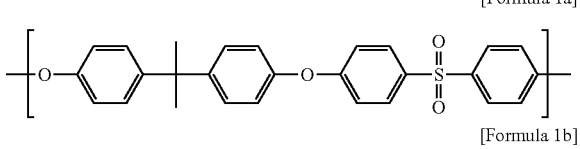

[Formula 1a]

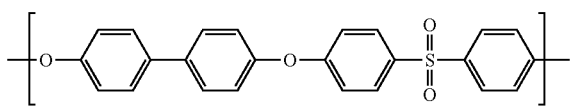

[Formula 1b]

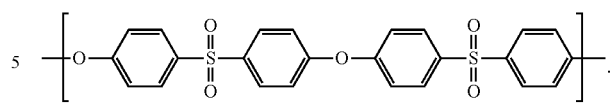

[Formula 1c]

5. The liquid crystalline polymer composition according to claim 1, wherein the inorganic fillers having a pH of 7 to 12 comprises at least one of calcium silicate and magnesium silicate.

6. The liquid crystalline polymer composition according to claim 1, wherein the liquid crystalline polymer and the aromatic sulfone polymer are present in a weight ratio of 1:0.7 to 1:3.5.

7. The liquid crystalline polymer composition according to claim 1, wherein the liquid crystalline polymer and the inorganic fillers having a pH of 7 to 12 are present in a weight ratio of 1:0.4 to 1:3.

8. The liquid crystalline polymer composition according to claim 1, wherein the aromatic sulfone polymer and the inorganic fillers having a pH of 7 to 12 are present in a weight ratio of 1:0.3 to 1:2.5.

9. The liquid crystalline polymer composition according to claim 1, wherein the liquid crystalline polymer composition has a spiral flow length of 170 mm to 200 mm, as measured on a specimen prepared by injection molding in a spiral-shaped mold having a width of 10 mm and a thickness of 2 mm under conditions of a molding temperature of 370° C., a mold temperature of 120° C., an injection pressure of 160 MPa, and an injection speed of 100 mm/s.

10. The liquid crystalline polymer composition according to claim 1, wherein the liquid crystalline polymer composition has a tensile strength of 800 kgf/cm² to 1,000 kgf/cm², as measured on a 3.2 mm thick specimen in accordance with ASTM D638.

11. The liquid crystalline polymer composition according to claim 1, wherein the liquid crystalline polymer composition generates 0.1 mg to 0.6 mg of dust, as measured on a 1.2 mm thick rib specimen prepared from the liquid crystalline polymer after a boss specimen prepared from the liquid crystalline polymer composition and fastened with an M3 screw is reciprocated on an upper surface of the rib specimen at a rate of 50 strokes/min under a load of 2.5 kg for 2 hours.

12. A molded article produced from the liquid crystalline polymer composition according to claim 1.

13. The molded article according to claim 12, wherein the molded article is a compact camera module part.

* * * * *